United States Patent [19]

Dowrelio

[11] 3,709,466
[45] Jan. 9, 1973

[54] ANCHOR HOIST
[76] Inventor: Antone Dowrelio, Foot of Port Street, Crockett, Calif. 94525
[22] Filed: Feb. 8, 1971
[21] Appl. No.: 113,187

[52] U.S. Cl. ................................254/187, 192/93 A
[51] Int. Cl. ..............................................B66d 1/00
[58] Field of Search ....254/150, 187; 192/93 A, 93 C

[56] References Cited

UNITED STATES PATENTS

| | | | |
|---|---|---|---|
| 2,669,427 | 2/1954 | Dowrelio | 254/187 |
| 2,675,105 | 4/1954 | Kelley | 254/187 X |
| 2,017,352 | 10/1935 | Quick | 254/187 |
| 2,985,113 | 5/1961 | Cotesworth | 192/93 A |
| 1,625,769 | 4/1927 | Ersted | 192/93 A |

*Primary Examiner*—Evon C. Blunk
*Assistant Examiner*—Merle F. Maffei
*Attorney*—Townsend and Townsend

[57] ABSTRACT

A power hoist for anchor chains and the like in which the rotation of the chain sprocket can be independently controlled of a drive motor. A sleeve is secured to a free shaft end disposed exteriorly of the gear housing and mounts the sprocket, a friction plate on each side of the sprocket and face cams for biasing the friction plates against the sprocket. The friction plates rotate with the sleeve and the shaft and the face cams are normally biased into a releasing position to prevent accidental rotation of the sprocket.

2 Claims, 4 Drawing Figures

PATENTED JAN 9 1973
3,709,466
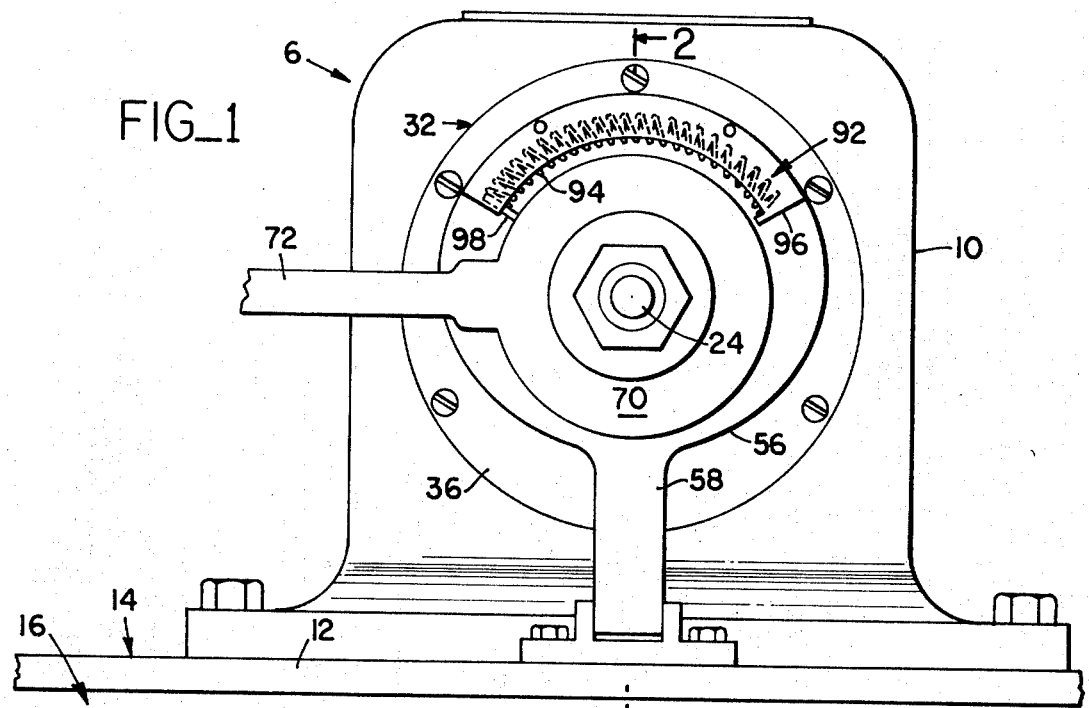
FIG_1
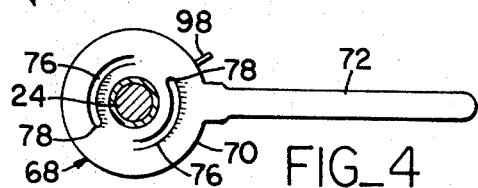
FIG_4
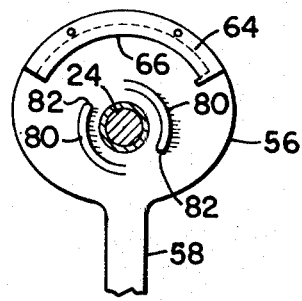
FIG_3
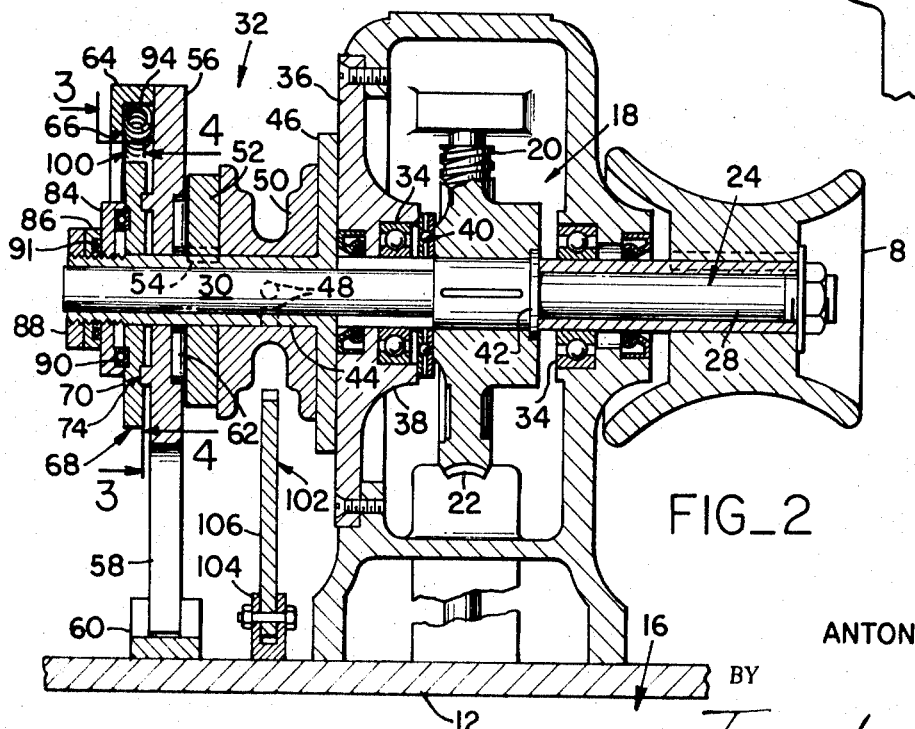
FIG_2
INVENTOR.
ANTONE DOWRELIO
BY
*Townsend and Townsend*
ATTORNEYS

ANCHOR HOIST

BACKGROUND OF THE INVENTION

Medium sized pleasure and commercial boats widely employ power drives for hoisting the anchor and for controlling its rate of descent. Such hoists usually also include concavely curved drums for frictionally engaging ropes to pull loads or to pull the boat towards the dock. The present invention is primarily concerned with the construction of the anchor chain pay out and take-in mechanism and the means for controlling it.

In the past, various anchor chain hoists have been available. A very successful hoist is illustrated in my U. S. Pat. No. 2,669,427, the disclosure of which is incorporated herein by reference. In that patent, a drive sprocket for the anchor chain is freely movable on a portion of a driven shaft projecting past a worm gear housing. The sprocket is disposed between a pair of friction plates or discs at least one of which is keyed to the shaft for rotation therewith. Face cams are defined by an exterior portion of the worm gear housing and an actuating plate rotatable with respect to the shaft and the housing is disposed between the housing and one of the friction discs. By angularly offsetting the actuating plate with respect to the face cams on the housing axial forces are applied to the friction discs which in turn lock the sprocket between the discs, or at least impair its free rotation, for the hoisting of the chain via the worm gear drive or for controlling the rate with which the anchor is dropped by maintaining the worm gear drive stationary and employing the friction discs as brakes acting on the sprocket.

The device described in that patent has proved highly successful and is presently widely employed. Its construction, however, has proven to be relatively expensive since it requires the maintenance of close tolerances. Moreover, the actuating plate, connected with a manually or automatically operated handle, was subjected to friction from the constantly rotating shaft. Under adverse conditions, particularly if the user of the hoist failed to properly lubricate and maintain it, relative angular offsets between the face cams on the housing and the actuating plate occurred. This could result in dragging the sprocket with the constantly rotating shaft. A dropped anchor could thereby be accidentally picked off the ground or excess anchor chain could be payed out with a possible loss of the chain as well as of the anchor.

SUMMARY OF THE INVENTION

The present invention provides a hoist for the take-up and pay out of anchor chains and the like. In its broad operating principles it is similar to the hoist disclosed in my above referenced U. S. Pat. No. 2,669,427 but is an improvement thereover which facilitates the ease with which the hoist is manufactured, and thereby lowers its cost, enhances the operating characteristics of the hoist, and reduces wear of the hoist to assure a long and trouble free service life with a minimum of maintenance.

Briefly, a hoist constructed in accordance with the present invention comprises a housing for securing to a support surface, mounting a gear drive for actuation by a motor and including a driven gear and a shaft coupled with the gear which has at least one free end that extends past the housing. Bearing means rotatably mount the shaft against radial and axial movement of the shaft. A sprocket for the anchor chain is rotatably disposed on the portion of the shaft disposed outside the housing and has at least one end face. A drive plate includes an axial side for engagement with the end face, is axially movably disposed on the shaft and is mounted thereto for rotation therewith. A pressure plate is also axially movably disposed on the shaft and is prevented from rotating. Means is provided for transmitting axial forces from the pressure plate to the drive plate and the sprocket whenever sprocket actuating means rotatably disposed on the shaft is operated. The maximum axial spacing between the sprocket and the actuating means is limited so that face cam operatively disposed between and coupled with the actuating means and the pressure plate are angularly offset by the actuating means to apply an axial force to the pressure plate biasing the pressure plate against the drive plate and the sprocket to thereby rotate the sprocket with the drive plate. To prevent unintentional operation of the sprocket the actuating means is normally biased into a force releasing position.

The bearing means comprises a thrust bearing limiting axial movements of the shaft and mounted between an interior end face of the housing and an axial end of the drive gear. This protects the bearing from premature damage as compared to its mounting on the exterior of the housing as was heretofore customary and assures a more direct axial force transmission between the hoist components and the gear housing to minimize stresses in the housing.

In the preferred embodiment of the invention, the pressure plate includes a radial arm that is grasped by a channel secured to the gear box support, e.g., the boat deck and which extends parallel to the shaft. Movements of the pressure plate in an axial direction are permitted by the channel. However, it locks the pressure plate against angular rotation about the shaft axis.

The hoist of the present invention eliminates the need for applying a face cam surface to the gear housings or flanges secured thereto. Moreover, the parts defining the cams are relatively small and they are, therefore, easier to machine which reduces their cost and enhances their accuracy. The automatic biasing of the actuating plate into a force releasing position further prevents friction forces developed between the components of the hoist mounted on the projecting shaft end from accidentally angularly offsetting the actuating plate and thereby dragging the sprocket with the friction plates. Accidental line or chain pay outs or take-ups are thus prevented. In addition, the means biasing the actuating plate into a force releasing position is so positioned that it simultaneously forms a physical protector for the surface cams to prevent their contamination and reduce wear.

BRIEF DESCRIPTION OF THE DRAWINGS

FIG. 1 is a front elevational view of an anchor hoist constructed in accordance with the invention;

FIG. 2 is a fragmentary side elevational view, in section, and is taken on line 2—2 of FIG. 1;

FIG. 3 is a reduced scale, fragmentary elevational view of one face of the cam or pressure plate and is taken on line 3—3 of FIG. 2; and FIG. 4 is a reduced scale cross sectional view of the face of the actuating plate cooperating with the pressure plate face illustrated in FIG. 3 and is taken on line 4—4 of FIG. 2.

DESCRIPTION OF THE PREFERRED EMBODIMENTS

Referring to FIGS. 1 through 4, a hoist 6 constructed in accordance with the invention is shown for use in lifting or lowering boat anchors (not separately shown) and for taking in or paying out rope from a cat head 8 for such tasks as pulling the boat to a dock or pulling loads on deck. The hoist broadly comprises a gear box 10 securely mounted to a deck 12 of a boat 14 above an anchor chain well 16. A suitable aperture, preferably including wear-plates (not shown) is provided for withdrawing the chain from the well and reinserting it therein. A worm gear drive 18 including worm 20 and driven gear 22 is disposed interiorly of box 10 and drives an elongate shaft 24 locked to gear 22 by a key 26. The shaft extends to the exterior of the box to define first and second shaft end portions 28 and 30. Cat head 8 is conventionally secured to shaft end 28. Shaft end 30 mounts a normally disengaged anchor chain drive 32 that enables the lifting and lowering of the anchor at a controlled speed. It will be apparent that drive mechanism 32 is not limited for use in conjunction with anchor chains and could be equally advantageously employed with cables, roller chains and for work with loads other than boat anchors.

Roller bearings 34 conventionally mount shaft 24 to gear box 10 and a closure 36 bolted to a face of the gear box. The closure provides access to the box interior and forms part of the box.

Closure 36 includes an inwardly facing annular flange 38 which is spaced from gear 22. A thrust bearing 40 is mounted between the end of annular flange 38 and gear 22 and limits movement of shaft 24 to the left as viewed in FIG. 2. A flange 42 engages the other end of gear 22 to lock it to shaft 24 and prevent relative motions of the gear and/or the shaft when subjected to a force biasing the shaft to the left as viewed in FIG. 2. This positioning of the thrust bearing protects it from contamination and corrosion. Moreover, forces from anchor chain drive 32 tending to pull the shaft to the left, as viewed in FIG. 2, are directly taken up by the thrust bearing instead of being transmitted past the gear to the other side of gear box 10.

Anchor chain drive 32 is mounted to shaft end 30 and comprises a sleeve 44 that is slipped over the shaft end and which includes an integral flange 46 closely adjacent or in contact with closure 36. Preferably, a needle or other low friction thrust bearing is provided between flange 46 and the closure to prevent wear, heat buildups and large frictional forces between them. Conventional set screws 48 tighten sleeve 44 on shaft end 30 and permit axial adjustments of the sleeve to limit axial tolerances and control axial shaft movement via thrust bearing 40 and flange 46, or the thrust bearing between the flange and the closure. In this manner, the shaft is secured against axial movements without applying large axial forces to roller bearings 34.

A conventional chain sprocket 50 has flat end faces and is freely rotatably disposed on sleeve 44. A second friction plate 52 is axially movably disposed on the sleeve on the side of sprocket 50 opposite flange 46. It is secured to the sleeve with a key 54 for rotation with the sleeve. Thus, it will be apparent that when second friction plate 52 is forced to the right, as viewed in FIG. 2, against sprocket 50, friction forces develop between the interengaging sprocket faces and the faces of friction plates 46 and 52 to rotate the sprocket with the plate, the sleeve and shaft 24. Conversely, release of an axial force disengages the sprocket from friction plates 46 and 52 so that it can remain stationary even though the plates, sleeve 44 and shaft are rotating.

A pressure or cam plate 56 is axially movably disposed on sleeve 44 on the side of friction plate 54 opposite sprocket 50. The pressure plate includes a downwardly extending arm 58 the free end of which is disposed in a channel 60 mounted to boat deck 12. The channel is aligned with the axis of shaft 24 to permit the arm and the pressure plate to move along the sleeve while preventing them from pivoting about the shaft axis. The side of the pressure plate facing friction plate 52 includes an annular recess which mounts a needle or other low friction thrust bearing 62 to limit the friction developed between the stationary pressure plate and the rotating friction plate. The upper end of the pressure plate is somewhat elongate and mounts a spring housing 64 that has an inner edge 66 concentric with shaft 24. The spring housing extends in an axial direction away from gear box 10 towards the free end of the shaft for purposes more fully described hereinafter.

An actuator 68 for engaging and disengaging chain drive 32 comprises an actuator plate 70 freely movably placed on sleeve 44 that includes a radially extending handle 72. The opposing sides of pressure plate 56 and actuator plate 70 define face cams 74 which spread the two parts apart, in an axial direction, if the actuator plate is angularly offset with respect to the rotationally stationary pressure plate. The face cams are defined by a pair of circularly arcuate face cam slots 76 in actuator plate 70 which include an inclined bottom surface that gradually slopes downwardly into the plate to a lowermost slot end 78. Conversely, pressure plate 56 includes a pair of raised cams 80 that have the same circularly arcuate configuration as cam slots 76 and which gradually increase in height, above the face of the plate, from the plate to a highest cam end 82. The depth of cam slot 76 is preferably slightly greater than the height of raised cams 80 so that when cam high end 82 is at slot low end 78 the opposing faces of the pressure plate 56 and actuator plate 70 are in contact.

A backup plate 84 is tightened against actuator plate 70 with a threaded nut 86 so that there is axial play in the component stack on sleeve 44 when face cams 74 are retracted, that is when high point 82 is aligned with low point 78 of the slot. When shaft 24 and the sleeve rotate, the sprocket remains stationary. A lock nut 88 is provided to set the free axial spacing between backup plate 84 and first friction plate 46. A thrust bearing 90 reduces friction between the rotating backup plate and the stationary actuator plate 70. Another thrust bearing 91 is interposed between nut 86 and backup plate 84 to assure substantially friction free relative rotation between the nut and the plate.

To assure that actuator 68 is normally in its released position to prevent accidental engagement of sprocket 50 with friction plates 46 and 52, means 92 is provided for biasing the actuator into its releasing position. This means include a helical compression spring 94 disposed within spring housing 64. One end of the spring rests against a closed housing end 96 while the other engages a finger 98 extending radially outward from the periphery of actuator plate 70. The periphery of the actuator is further so selected that it is closely adjacent inner spring housing edge 66. The inner spring housing edge defines an open passage 100 through which finger 66 can pass when the actuator is pivoted in a clockwise direction, as viewed in FIG. 1, to compress spring 94. Release of actuator handle 72 automatically returns the actuator to its released position shown in FIG. 1. The interengagement between lowermost cam slot end 78 and highest raised cam end 82 provides a stop beyond which the spring cannot rotate the actuator.

In use, a drive motor (not shown) rotates worm 20, gear 22 and shaft 24. During non-use of the hoist spring 94 biases actuators 68 in a counterclockwise direction, as viewed in FIG. 1, so that the combined thickness of the components between first friction plate 46 and backup plate 84 is less than the distance between these two plates. Rotation of sleeve 44 is therefore not imparted on sprocket 50. Conversely, if the shaft 24 is not driven, sprocket 50 may rotate with respect to the shaft and sleeve 44 as when an anchor is permitted to drop freely to the water floor.

When the free dropping anchor is to be slowed down or stopped, actuator handle 72 is pivoted in a clockwise direction, as viewed in FIG. 1, whereby the effective combined width of the component on sleeve 44 between first friction plate 46 and backup plate 84 is increased until the stack width equals the spacing between these plates. This causes the formation of an axial force between face cams 74 which is transmitted to second friction plate 52 via needle bearing 62. The faces of sprocket 50 are frictionally engaged by the friction plates so that relative rotation of the sprocket with respect to the friction plate can be controlled and stopped. When the shaft is stationary, the anchor chain drive 32 of the present invention can thus be employed as a brake. Conversely, with plates 46 and 52 in engagement with sprocket 50, the sprocket is coupled to drive shaft 24 and rotated therewith for raising the anchor or lowering the anchor at the motor speed.

To prevent chain links (not shown) from wrapping about sprocket 50 and causing failure of the hoist, a chain stripper 102 is mounted beneath the sprocket and secured to boat deck 12. The stripper comprises a base 104 to which a flat upright plate 106 is secured. The upper end of the plate is closely adjacent the periphery of the sprocket, has a circularly arcuate configuration and is concentric with the sprocket. Chain links are thereby prevented from remaining on the sprocket and are in effect peeled off.

I claim:

1. A boat hoist for controlling the take-up and pay out of lines such as anchor chains independently of a power drive mechanism, the hoist comprising: a gear box housing a worm drive including a gear keyed to a shaft having at least one end projecting to the exterior of the housing for rotation of the shaft with the gear, a thrust bearing disposed interiorly of the box between an axial end of the gear facing towards the projecting end of the shaft and a portion of the box for limiting axial shaft movements in a first direction, a sleeve slipped over the projecting shaft end and including a first friction disc rigidly projecting from the sleeve, means for immovably securing the sleeve to the projecting shaft and permitting an axial adjustment of the sleeve position to control the amount of permissible axial movement of the shaft in the other direction, a second friction disc axially spaced from the first disc and keyed to the sleeve for rotation therewith and relative axial movement with respect to the sleeve, a sprocket disposed between the discs and including friction faces for engagement by the discs so that the sprocket is rotated with the shaft and the discs when the discs are axially biased against the sprocket, an axially movable, non-rotatable pressure plate disposed on the side of the second disc opposite the sprocket, the pressure disc including a radially extending arm, means for grasping the arm to prevent rotational movement of the arm about the shaft axis and permitting movements of the arm and the pressure plate in the direction of the axis, low friction means between the second disc and the pressure plate for the transmission of axial forces therebetween, an actuating plate disposed on the side of the pressure plate opposite the second disc and rotatable with respect to the sleeve, at least a portion of the actuating plate having a lesser radial extent than at least a portion of the pressure plate, means for angularly offsetting the actuating plate with respect to the pressure plate, means for limiting the maximum distance between the first friction plate and the actuating plate, face cams defined by the pressure plate and the actuating plate for increasing the axial distance between them to thereby apply axial forces to the friction discs and impair the free rotation of the sprocket with respect to the sleeve and the shaft, a spring housing mounted to the relatively larger pressure plate portion having a longitudinal extent about concentric with the axis of the shaft, an open and a closed end, and extending in an axial direction over the relatively smaller portion of the actuating plate, the housing including a slotted opening facing the actuating plate and extending from the open end of the housing towards the other end thereof, radial finger means projecting from a periphery of the actuating plate and disposed adjacent the open housing end when the pressure plate and the actuating plate are in an axial force releasing position, the finger means having a configuration permitting their entrance into the housing through the open end and the slotted opening, a helical compression spring disposed within the housing, having its ends supported by a closed end and the finger means and biasing the actuating plate in a force releasing direction, to prevent accidental frictional engagements between the sprocket and the friction discs due to uncontrolled angular displacements of the actuating plate from frictional forces caused by the rotation of the sleeve.

2. A hoist according to claim 1 wherein the housing is separate of the pressure plate and including means for securing the housing to the pressure plate.

* * * * *